Patented Dec. 25, 1934

1,985,622

UNITED STATES PATENT OFFICE 1,985,622

LACTOBACILLI FRUIT AND VEGETABLE JUICES

John Reichel and Harry A. Cheplin, Philadelphia, Pa., assignors to Sharp & Dohme, Inc., Philadelphia, Pa., a corporation of Maryland No Drawing. Application June 10, 1931, Serial No. 543,389

8 Claims. (Cl. 99—11)

This invention relates to fruit and vegetable juices and beverages containing lactobacilli and more particularly containing acidophilus bacilli.

The new fruit and vegetable juices and beverages are uncultured products having substantially the normal taste, volume and composition of such juices and beverages but which nevertheless contain therein lactobacilli in amount or number comparable with those present in fermented lactobacillus products generally offered on the market.

The commercial lactobacillus products such as acidophilus and bulgaricus milk, whey or bouillon preparations are made by adding pure cultures of the lactobacilli to sterilized milk, whey or bouillon and by subjecting the same to a period of incubation at a temperature around 35 to 40° C. and fermentation. During this period of incubation the lactobacilli grow and multiply in, and at the expense of some of the media, thus changing this media physically, chemically and in taste or flavor. The fermentation usually results in the development of a considerable amount of lactic acid and gives the product a sour or acid taste and a more or less changed consistency.

The new products of the present invention are unfermented fruit and vegetable juices and beverages which are free from the sour taste or acid character of fermented lactobacilli products but which nevertheless contain an amount or number of the lactobacilli comparable with the number contained in fermented lactobacilli products. The new lactobacilli products accordingly have the taste, appearance and consistency of their original state and in addition have the advantages of supplying a comparable amount and number of lactobacilli per unit volume of such fruit and vegetable juices and beverages.

While various fruit and vegetable juices and beverages can be employed and converted into lactobacilli products, we regard orange and tomato juices particularly advantageous. The incorporation of lactobacilli such as acidophilus bacilli in such juices gives acidophilized orange juice or tomato juice with substantially the normal taste, volume and composition of such juices but nevertheless containing the acidophilus bacilli in an amount, for example, comparable with the amount or number contained in the fermented acidophilus product. Such fruit juices may contain, for example, around two hundred million or more acidophilus bacilli per cubic centimeter or as many as a thousand million or more per cubic centimeter.

In preparing the new lactobacilli fruit and vegetable products we make use of a separately grown and prepared lactobacillus culture in the form of a stabilized concentrate whose concentration of lactobacilli is so large that the total volume or amount of culture added to the fruit or vegetable juice or beverage is only a very small fraction of one percent of the volume of such fruit and vegetable juices; and we add the lactobacillus concentrate while the fruit and vegetable juices are at a low temperature which prevents or retards subsequent growth of the added culture.

We have found that when such fruit and vegetable juices are acidophilized by the addition of acidophilus bacilli concentrate they will remain practically unchanged for a considerable period of time if maintained at a low temperature, and we have also found that the lactobacilli so incorporated into the fruit and vegetable juices will remain active and will not undergo rapid loss of viability such as would prevent the fruit and vegetable juices from containing the necessary or desirable lactobacilli content.

The stabilized lactobacilli concentrate can be readily prepared in accordance with the method set forth in our companion application Serial No. 543,388, issued as Patent No. 1,957,555, of May 8, 1934, by digesting milk or casein with a ferment such as trypsin, reinforced with certain other nutritive or growth factors such as peptone, dextrin and calcium carbonate, growing the lactobacilli in such specially prepared culture medium which encourages the rapid growth of viable lactobacilli in high concentration and then separating the lactobacilli by settling or centrifuging so that a very small amount of the recovered or harvested mass of lactobacilli, for example, about two grams, will contain the number of viable lactobacilli obtained in a quart of fermented acidophilus milk, for example, one thousand billion lactobacilli.

The lactobacilli mass thus prepared is relatively unstable. It is advantageously stabilized as described in said companion application by the addition of neutralizing and buffering agents which will neutralize the acidity of the mass and provide it with buffering agents which will stabilize the mass. The neutralizing or buffering agents which we have found particularly valuable are sterile milk and milk of magnesia in the ratio of about one-third to one-half pound of the former and 40 to 60 cc. of the latter per one-pound mass of lactobacilli. These agents are readily incorporated by thorough mixing or agitation such as gentle rotary agitation for from one-half hour to one hour. The untreated mass of lactobacilli appears as a plastic, sticky mass of clay or putty-like consistency, light brown or grayish-yellow in color, acid in reaction, and having a pH value of approximately 3.0 to 4.5. The neutralized and stabilized concentrate is obtained in the form of a thick viscous liquid. The addition of the neutralizing and buffering agents is made immediately after the harvesting of the lactobacilli from the culture medium by settling or centrifuging.

The treatment of the freshly prepared unstable mass of lactobacilli with the neutralizing and stabilizing agents brings about the stability in the viability of the lactobacilli by neutralizing the acids and other metabolic by-products toxic to the bacterial cell which generates them and buffering the entire medium to such a point of complete chemical stability as to preserve the viability of the lactobacilli for a considerable period of time, for example, for a period of six to ten days or longer.

The stabilized concentrate thus produced can readily be admixed with fruit and vegetable juices and beverages. In preparing the new lactobacilli products, the fruit and vegetable juices may or may not be first pasteurized, but in either case they should be cooled to a relatively low temperature, for example, around 33 to 40° F., before the lactobacilli concentrate is added thereto and incorporated therewith.

After acidophilization, the fruit and vegetable juices should be kept at a relatively low temperature, and, when so kept, the acidophilus bacilli retain their activity for considerable periods of time without either growing or developing to any material extent, and similarly without serious loss in viability of the lactobacilli. The lactobacilli products are, therefore, highly stabilized products, with advantages such as the fermented lactobacilli milk, whey or bouillon cultures have in lactobacilli content, but without the objections and obvious disadvantages of such fermented products. The new products have the advantages of the original fresh fruit and vegetable juices, and, in addition, have the therapeutic advantages of cultured or fermented lactobacilli products.

In the case of orange juice and tomato juice or other fruit and vegetable juices it is thus readily possible to incorporate a number or amount of lactobacilli, e. g., about two grams or cubic centimeters, so that the product will contain, for example, around one thousand billion lactobacilli per quart or around one thousand million lactobacilli per cubic centimeter. For therapeutic purposes, it is desirable to provide, on the average, around two hundred million lactobacilli or more per cubic centimeter of product.

While we have referred to an average of about two hundred million of lactobacilli per cubic centimeter of product it will be evident that a much larger amount or number can readily be incorporated, for example, a billion or more lactobacilli per cubic centimeter, thus making the product superior in its content of lactobacilli to cultured or fermented lactobacilli products, but with media which lend themselves to greater advantage for administration of lactobacilli because of their wide acceptability to various classes of patients. It is one signal advantage of the invention that it enables a greatly increased number of the lactobacilli to be incorporated in a unit volume of the fruit and vegetable juices than it would or could be possible to produce by the fermentation process.

Fruit and vegetable juices in which lactobacilli have been incorporated according to the present invention retain their normal physical properties, such as appearance, color, volume and taste as well as their normal chemical composition. Such physical and chemical properties would be materially altered or changed if a comparable amount or number of lactobacilli were allowed to develop in the product by the usual or customary process of fermentation.

We claim:

1. New lactobacillus products comprising fruit and vegetable juices containing stabilized and buffered lactobacilli in number or amount comparable with those present in cultured or fermented lactobacillus products, said new fruit and vegetable juices retaining substantially unchanged their normal physical appearance, volume, taste and keeping qualities, said bacilli being stabilized and buffered and having their viability preserved thereby.

2. New lactobacillus products comprising fruit and vegetable juices having a stabilized lactobacilli concentrate admixed with neutralizing and buffering agents incorporated therein and having substantially the same volume, taste and keeping qualities as before such incorporation, the number of lactobacilli being in excess of about two hundred million to the cubic centimeter, and said bacilli being stabilized and buffered and their viability preserved in the juice in which they are incorporated.

3. New lactobacillus products comprising fruit and vegetable juices having a stabilized lactobacilli concentrate admixed with neutralizing and buffering agents incorporated therein and having substantially the same volume, taste and keeping qualities as before such incorporation, the number of lactobacilli being in excess of a billion to the cubic centimeter, and said bacilli being stabilized and buffered and their viability preserved in the juice in which they are incorporated.

4. New acidophilus bacillus products comprising fruit and vegetable juices containing acidophilus bacilli in number or amount comparable with those present in cultured or fermented acidophilus products, said new fruit and vegetable juices also containing stabilizing and buffering agents and retaining substantially unchanged their normal physical appearance, volume, taste and keeping qualities, and said bacilli being stabilized and their viability preserved by said stabilizing and buffering agents.

5. New acidophilus products comprising fruit and vegetable juices having a stabilized acidophilus bacilli concentrate admixed with neutralizing and buffering agents incorporated therein and having substantially the same volume, taste and keeping qualities as before such incorporation, the number of acidophilus bacilli being in excess of about two hundred million to the cubic centimeter, and said bacilli being stabilized and buffered and their viability preserved in the juice in which they are incorporated.

6. New acidophilus bacillus products comprising fruit and vegetable juices having a stabilized acidophilus bacilli concentrate admixed with neutralizing and buffering gents incorporated therein and having substantially the same volume, taste and keeping qualities as before such incorporation, the number of acidophilus bacilli being in excess of a billion to the cubic centimeter, and said bacilli being stabilized and buffered and their viability preserved in the juice in which they are incorporated.

7. The method of producing new lactobacillus products which comprises admixing with fruit and vegetable juices a stabilized lactobacillus concentrate of such small volume that the volume of such fruit and vegetable juices is not materially changed and with such number and amount of lactobacilli that the fruit or vegetable juice will contain in excess of about two hundred million to the cubic centimeter, said concentrate containing neutralizing and buffering agents which preserve and buffer the bacilli, and maintaining such fruit and vegetable juices at a low temperature.

8. The method of producing new acidophilus bacillus products which comprises admixing with fruit and vegetable juices a stabilized acidophilus concentrate of such small volume that the volume of such fruit and vegetable juices is not materially changed and with such number and amount of acidophilus bacilli that the fruit or vegetable juice will contain in excess of about two hundred million to the cubic centimeter, said concentrate containing neutralizing and buffering agents which preserve and buffer the bacilli, and maintaining such fruit and vegetable juices at a low temperature.

JOHN REICHEL.
HARRY A. CHEPLIN.